United States Patent [19]

Street

[11] Patent Number: 5,712,574

[45] Date of Patent: *Jan. 27, 1998

[54] APPARATUS FOR POSITION DETECTION AND VERIFICATION THEREOF USING PULSE PATTERNS HAVING SEQUENTIALLY UNIQUE PROPERTIES

[75] Inventor: Thomas Street, Southgate, Mich.

[73] Assignee: Rockwell Light Vehicle Systems, Inc.

[*] Notice: The term of this patent shall not extend beyond the expiration date of Pat. No. 5,350,955.

[21] Appl. No.: 532,287

[22] Filed: Feb. 1, 1995

Related U.S. Application Data

[63] Continuation of Ser. No. 924,122, Sep. 27, 1994, Pat. No. 5,350,955.

[51] Int. Cl.$^6$ .................................................... G01R 27/08
[52] U.S. Cl. .......................... 324/714; 324/160; 324/176; 340/870.38; 341/16
[58] Field of Search .......................... 324/713, 714, 324/716, 160, 161, 176, 178, 180; 340/870.38; 341/16

[56] References Cited

U.S. PATENT DOCUMENTS

| | | |
|---|---|---|
| 3,585,376 | 6/1971 | Toscano . |
| 3,602,700 | 8/1971 | Jerva et al. . |
| 3,963,971 | 6/1976 | Leenhouts et al. . |
| 4,080,515 | 3/1978 | Anderson . |
| 4,085,890 | 4/1978 | Kimura et al. ................ 364/561 X |
| 4,214,483 | 7/1980 | Young ................................ 324/176 |
| 4,287,461 | 9/1981 | Promis et al. . |
| 4,408,118 | 10/1983 | Grozinger et al. . |
| 4,427,970 | 1/1984 | Devol ............................... 324/160 X |
| 4,626,699 | 12/1986 | Oesterle et al. ................. 324/180 X |
| 4,642,519 | 2/1987 | Klein et al. ..................... 324/121 R |
| 4,788,497 | 11/1988 | Katsumura ..................... 324/160 X |
| 4,839,646 | 6/1989 | Tyson ............................... 324/160 X |
| 4,994,752 | 2/1991 | Hata .................................... 324/714 |
| 5,048,063 | 9/1991 | Isobe et al. ................. 340/870.19 X |
| 5,049,827 | 9/1991 | Tasma .............................. 324/714 X |
| 5,350,955 | 9/1994 | Street ............................... 324/160 X |
| 5,399,981 | 3/1995 | Vermesse ........................... 324/714 |

FOREIGN PATENT DOCUMENTS

| | | |
|---|---|---|
| 0024463 | 3/1982 | European Pat. Off. . |
| 4038284 | 6/1992 | Germany . |
| 2125645 | 3/1984 | United Kingdom . |
| 8904566 | 5/1989 | WIPO . |

OTHER PUBLICATIONS

Hazen, Mark E. *Experiencing Electronics,* (1989),pp. 102, 103 Month Unavailable.

*Primary Examiner*—Ernest F. Karlsen
*Assistant Examiner*—Diep Do

[57] ABSTRACT

An apparatus for position detection using signal patterns created by use of a fixed disk having three conductive patterns disposed thereon. The first and second patterns are annular conductive paths which are concentric with respect to one another and the third pattern consists of radially extending conductive portions which are electrically connected to the second pattern. A brush carried by a rotating member whose position is sought to be determined is maintained in contact with the first and third pattern. In this manner an electrical signal variation is encountered as the radially extending conductive portions are encountered by the brush upon rotation thereof. This variation is thus correlated to the pattern defined on the third pattern. A microprocessor is used to add and subtract signals as the brush is rotated from a reference position based upon an indicia of motor direction. Sequential radially extending conductive portions of said third pattern are arranged into subgroups which provide a unique signature corresponding to the respective position. A sorted positional value is updated as rotation is initiated and after sufficient rotation has occurred to identify a subgroup, a comparison is performed to detect the presence of error. If no error is present the position will continue to be updated; adding and subtracting pulses. If an error is detected, the new subgroup and pulse position therein will be accepted as the correct positional value.

16 Claims, 2 Drawing Sheets

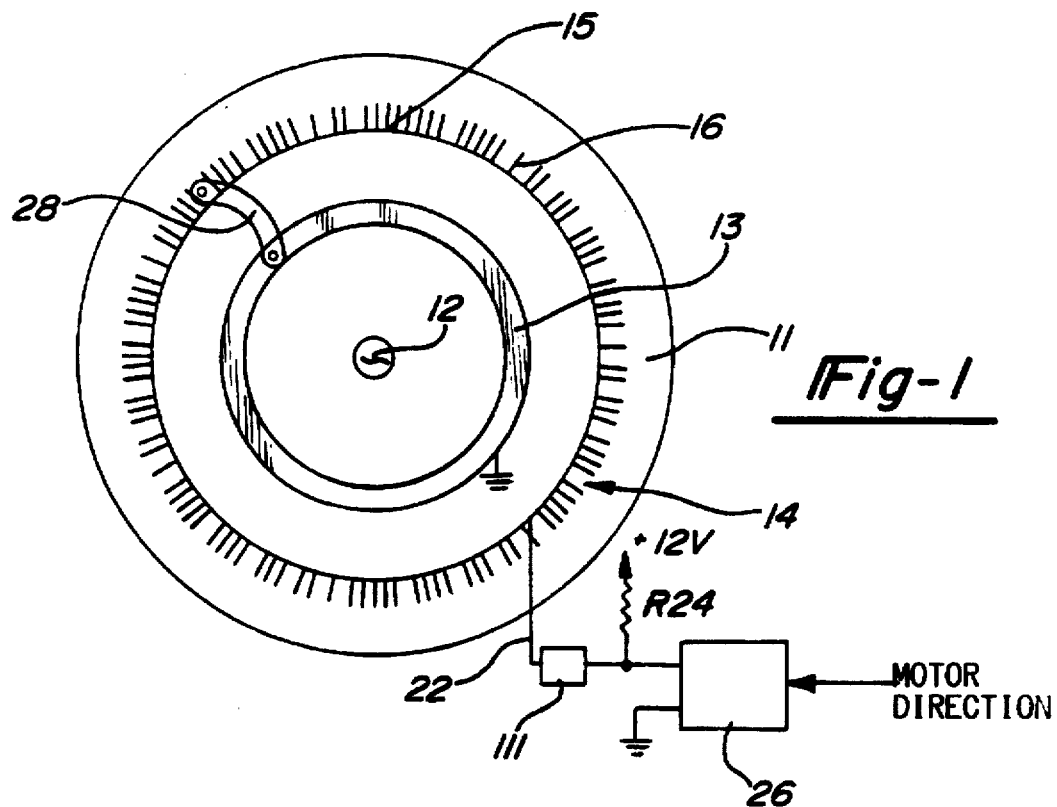
*Fig-1*
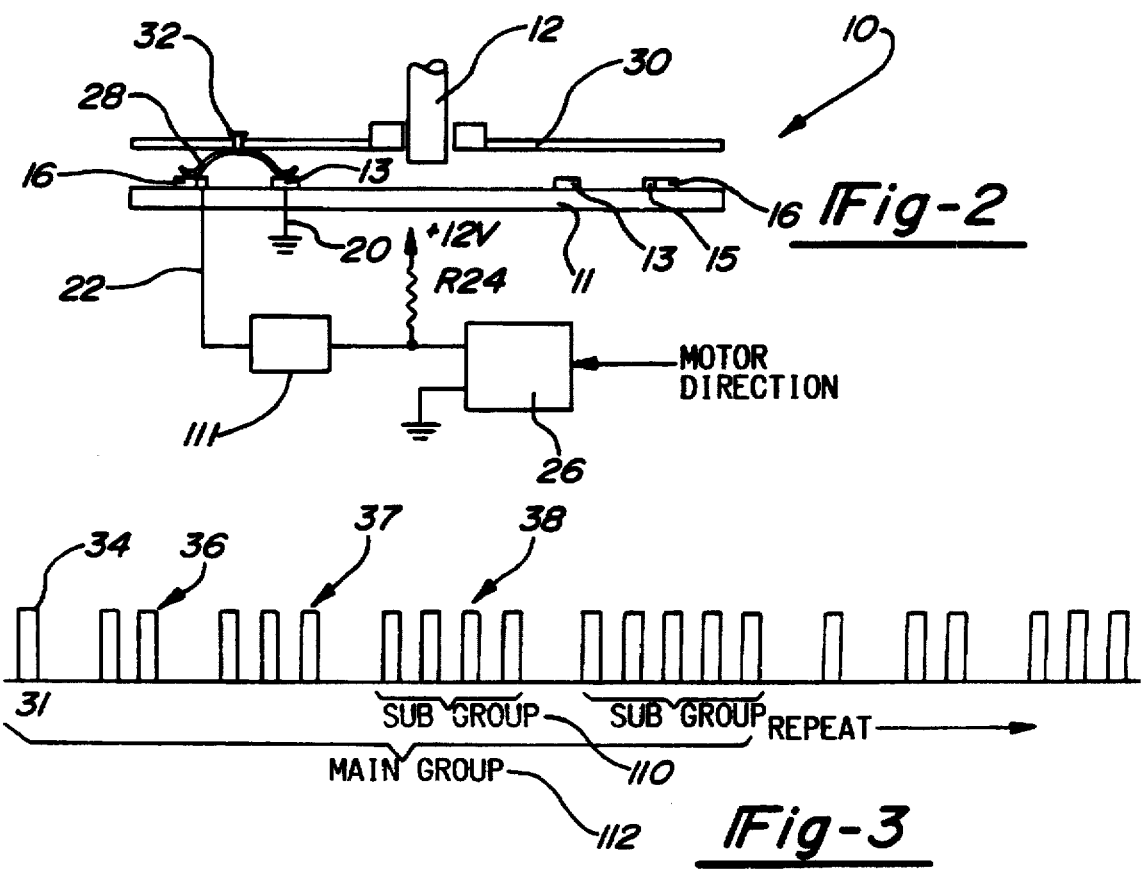
*Fig-2*
*Fig-3*

APPARATUS FOR POSITION DETECTION AND VERIFICATION THEREOF USING PULSE PATTERNS HAVING SEQUENTIALLY UNIQUE PROPERTIES

RELATED APPLICATIONS

This application is a continuation of U.S. application Ser. No. 07/924,122, issued Sep. 27, 1994 as U.S. Pat. No. 5,350,955, and claims priority under the Patent Cooperation Treaty based upon international application PCT/US93/07279.

BACKGROUND OF THE INVENTION

1. Field of the Invention

This invention relates to position detecting apparatus and, more specifically, to position detecting apparatus using a unique pulse pattern to define and continuously verify a respective position detection.

2. Description of the Related Art

In many control applications it is necessary to know the position of a movable portion of the system. Several methods have been used to accomplish such an objective. A first group of methods provides an absolute position of the system at any given point. These sensors typically utilize a potentiometer which provides a resistance value corresponding to a specific position. The advantage of this type of system is that there is no loss of reference such that the system requires calibration. A second group of position sensors are relative in nature. These systems have a zero or calibration point and generate pulses as the system moves from this point of calibration. The system position is determined by adding or subtracting the pulses that are encountered or generated as the system moves from the zero position. Typically, these pulses are provided by use of a Hall effect sensor, an optical sensor or a make/brake switch configuration. The advantage of such a system is its simplicity over the absolute sensors. The disadvantage is that if the pulses are counted in the wrong direction, the system will not correctly correspond to the position indicated. Another disadvantage is that if a stored position is incorrect, the system has no means of self calibration to provide continuous error correction.

DE-A-40,38,284 shows a motor control for a driven member. A sensor detects the angular position of the member by determining the number of pulses that are established corresponding to each of three groups of elements.

EP-A-0,047,463 shows an electronic micrometer. By rotating a spindle of the micrometer, a count in a control circuit determines the position of a disc substrate by sensing a contact pattern. A signal is obtained which corresponds to the contact pattern that is in registry with brush contacts to obtain a reading that represents the spacing at an anvil.

WO-A-89/04566 discloses a position indicator which obtains a reading by scanning sectors of signal tracks to obtain a reading that corresponds to the angular position of the part being scanned.

GB-A-2,125,645 discloses a rotary digital switch. A controller sequentially detects the difference in the switch position relative to a so-called set point stored in ROM. If the current detected contact condition for the switch is different from the former contact position stored in the memory, the switch is moved so that the stored value corresponds to the actual value following start-up.

SUMMARY OF THE PRESENT INVENTION

The present invention includes an apparatus for position detection using signal, or pulse, patterns created by use of a fixed disk having three conductive patterns disposed thereon. The first and second patterns are annular conductive paths which are concentric with respect to one another and the third pattern consists of radially extending conductive portions which are electrically connected to the second pattern. A brush carried by a rotating member whose position is sought to be determined is maintained in contact with the first and third pattern. In this manner an electrical signal variation is encountered as the radially extending conductive portions are encountered by the brush upon rotation thereof. This variation is thus correlated to the pattern defined on the third pattern. A microprocessor is used to add and subtract signals as the brush is rotated from a reference position based upon indicia of motor direction. Sequential radially extending conductive portions of said third pattern are arranged into subgroups which provide a unique signature corresponding to the respective position. A stored positional value is updated as rotation is initiated and, after sufficient rotation has occurred to identify a subgroup, a comparison is performed to detect the presence of error. If no error is present the position will continue to be updated by adding and subtracting pulses. If an error is detected, the new subgroup and pulse position therein will be accepted as the correct positional value.

These and other aspects of the present invention will become more readily apparent by reference to the following detailed description of the embodiments as shown in the drawings.

BRIEF DESCRIPTION OF THE DRAWINGS

FIG. 1 is a plan view of the sensor used to determine position of a rotary shaft;

FIG. 2 is a side view of the sensor used to determine position of a rotary shaft;

FIG. 3 is a signal pattern produced upon rotation of the disk of FIG. 1; and

DETAILED DESCRIPTION OF THE PREFERRED EMBODIMENT

Figure 4:
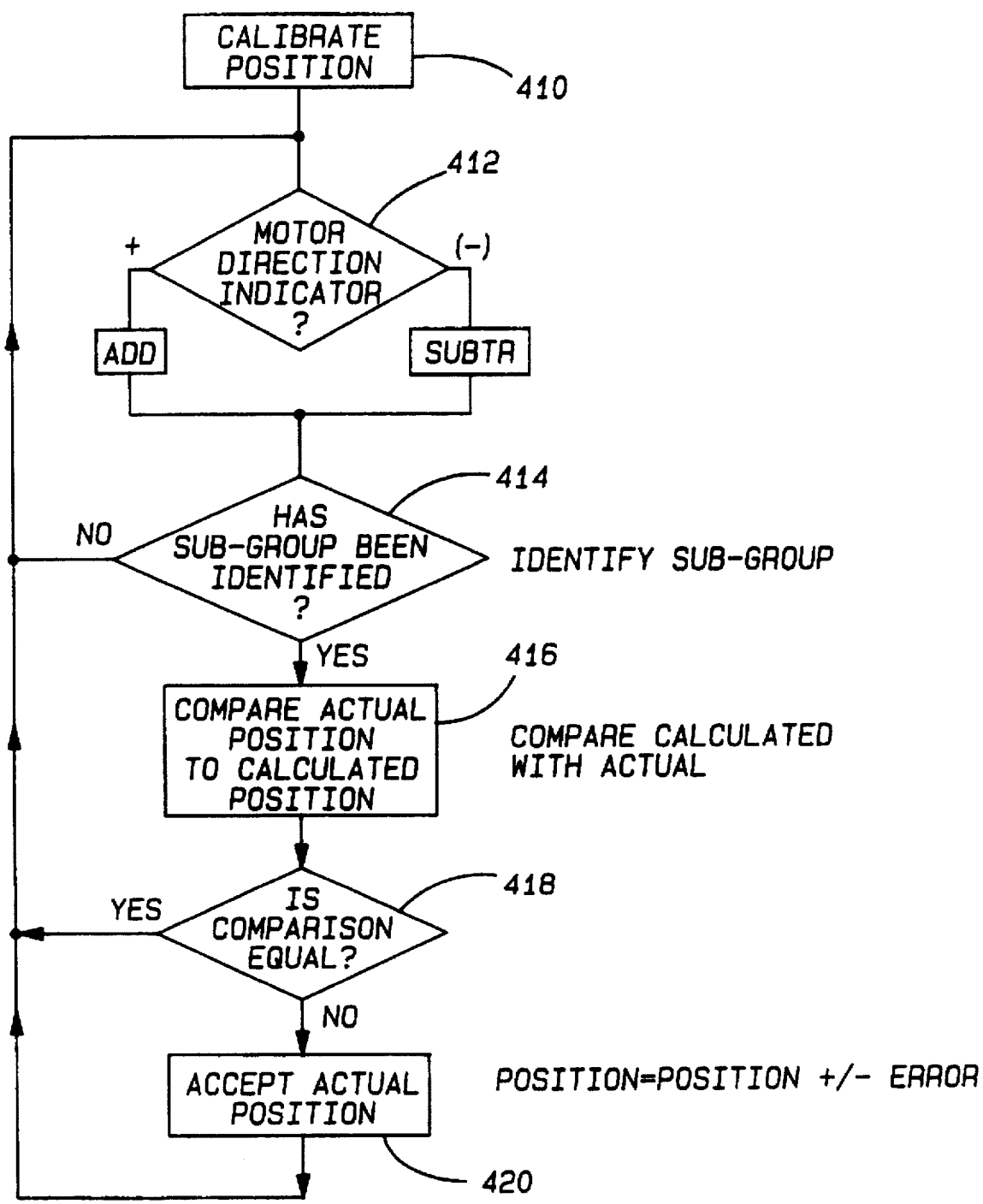
FIG. 4 is a flow chart of the operational characteristics of the present invention.

The preferred embodiment of the present invention, as shown in FIG. 1 and FIG. 2, comprises a sensor 10 defined as a generally radially extending surface 11 fixed rigidly with respect to rotatable shaft 12. Surface 11 includes a first and second pattern 13, 14 defined thereon. First pattern 13 is an annular conductive portion of surface 11. A second concentric annular pattern 14 comprises a first portion 15 being annular and a second portion 16 comprising a pattern of radially extending conductive portions having a first void between sequentially radially extending portions. The radially extending conductive portions are organized into sequentially unique subgroups which are separated by a second void. Each subgroup offering a sequentially unique signature is typically distinguished by an incremental radially extending portion. The groups are divided into subgroups and main groups as shown in FIG. 3. The radially extending surface 11 is preferably constructed of an insulating material providing a high dielectric strength. The respective patterns are formed of a conductive coating which may be silk screened thereon or applied using known techniques of decalcomania, or prepared or applied as metal stampings, or prepared using techniques of chemical etching.

A first connection 20, such as a commonly-used soldered connection, provides electrical communication with the first pattern 13, connecting it to a system ground. A second connection 22 connects annular portion 15 of the second pattern 14 to a 12 volt source through resistor R24. R24 provides a known circuit load. A low pass filter 111 is incorporated to eliminate any unwanted signal distortion due to brush contact discontinuity from bounce or dirt.

Microprocessor 26 monitors voltage variation at point A of the respective circuit. A brush 28 is connected to rotary disk 30 by pin 32 and maintained in electrical continuity between portion 16 of pattern 14 and pattern 13. Brush 28 15 is a conventional sliding commutating brush which is well known to those skilled in the art.

Such a system may be used to generate a signal pattern illustrated in FIG. 3. This signal pattern includes a reference or calibration position shown as locus 31 corresponding positionally with a first signal 34 spaced from a sequentially appearing pair of signals comprising subgroup 36, spaced from a sequentially appearing set of three signals comprising subgroup 37, spaced sequentially from a fourth set of signals comprising subgroup 38. The subgroups are positionally registered to correspond to unique positions of said movable component. Signal 34 and subgroup 36, 37, 38 collectively comprise a main group 112 which may be repeated about the perimeter of surface 11, or alternatively may appear as a singular main group 114 comprising unique subgroups each featuring an incremental signal thereby providing a distinction from a sequentially preceding subgroup.

Each sequential subgroup produces a unique signatured signal. This signature signal appears as a respective group of voltage variations, and provides a correlation to a specific location of rotary displacement. Such signal patterns are produced as a voltage variation as disk 30 carries brush 28 over the patterns defined on surface 11.

Using the signal pattern generated by the preferred embodiment of the present invention, it is possible to continuously verify the positional accuracy of a calculated position of a rotatable shaft by comparisons of calculated positions with actual positions. The calculated position can be determined by counting the signals or voids thereof encountered as the shaft is rotated from reference position 31 and adding or subtracting the signals or voids to a calibrated position. The decision to add or subtract is based upon a signal providing indicia of motor direction. Each sequential subgroup of signals will provide a unique signature consisting of the number of signals present therein. If a calculated position does not match an actual position, the actual position is accepted.

Corrections are made when an error is detected by accepting the pattern which is received. For example, if the system has determined that it is on signal two of a subgroup of three signals, and by counting pulses it determines that it was in fact on signal one of a subgroup of three, the system can adjust itself to correct the mistaken location. The system is initially calibrated by establishing a known position. Such a position may be an automobile window in its closed position against a seal. Such a position is referred to as the calibrate position step 410 of FIG. 4. Movement from this position produces signals which are counted and either added or subtracted in step 412. The decision to add or subtract is based upon motor direction. Once a subgroup has been identified in step 414, by comparison to stored signal sequence information, positional calculation determined in step 412 is compared in step 416 with the actual position of the respective identified subgroup. If the calculated and monitored positions are identical, no error correction is needed, and the calculated position is verified. If not, position correction is made in step 420 accepting the actual position.

The system is also capable of confirming direction of motion by monitoring the order in which the signal groups are generated. That is, if the signal groups are detected in a predetermined sequence (i.e. up or down), the direction is known from the sequence in which they appear. Finally, the velocity of the system can be determined by measuring the period of a signal as the signals are generated by the system.

The preferred embodiment of the present invention incorporates a Motorola 68HC05P7 microcontroller. When programmed in machine language implementing the flow chart of FIG. 4, the present invention provides an inexpensive and reliable sensor capable of monitoring the rotary position of a system component.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the scope of the invention.

I claim:

1. An apparatus for detecting the rotary position of a rotary member, said rotary member having an axis of rotation, said apparatus comprising:

a fixed radially extending member having a dielectric surface, said rotary member rotating with respect to said fixed member;

a first annular portion disposed on said dielectric surface defining a first conductive path formed essentially coaxial to said rotary member axis;

a second annular portion disposed on said dielectric surface defining a second conductive path essentially concentric to said first annular portion;

a third annular portion disposed on said dielectric surface including spaced radially extending conductive portions, said spaced radially extending conductive portions comprising a first subgroup having one radially extending portion sequentially followed by at least one other subgroup having more than one radially extending portions, said first and other subgroups repeating to form a complete pattern about said third portion;

said second and said third portions being electrically connected to one another; first means for connecting said first annular portion to ground potential;

second means for establishing an electrical voltage potential connection to said second annular portion;

third means for establishing a slidable conductive connection between said first annular portion and said third annular portion, said third means connected to said rotary member for rotation therewith, said provided voltage potential alternately providing a first voltage signal when said slidable conductive connection contacts both said first annular portion and one of said radially extending conductive portions and providing a second voltage signal when said slidable conductive connection contacts only said first annular portion without contacting one of said radially extending portions;

logic means for identifying the number of radially extending conductive portions contacted by said slidable conductive connection by monitoring said first and second voltage signals, said logic means further adapted for comparing said identified number to a predetermined number associated with each rotary portion of said rotary member, said logic means further adapted to establish a position correction signal when said predetermined number differs from the number of radially extending conductive portions identified in any of said subgroups.

2. An apparatus of claim 1, wherein said radially extending member is constructed from ceramic.

3. An apparatus of claim 1, wherein said first, second and third portions comprise a chemically etched conductive layer.

4. An apparatus of claim 1, wherein said first, second and third portions comprise metallic stampings.

5. An apparatus of claim 1, wherein said third means for establishing a slidable conductive connection between said first annular portion and said third annular portion is a commutating brush.

6. An apparatus of claim 1, wherein said rotary member comprises a rotary shaft.

7. An apparatus of claim 2, wherein said spaced, radially extending conductive portions are arranged in sequentially unique groups, said apparatus further comprising a circuit including a voltage source and a circuit load, wherein said circuit is alternately completed as said spaced, radially extending conductive portions contact said slidable conductive connection.

8. An apparatus for detecting the position of a movable system component, said movable component moved by a force means input through a shaft, comprising:

a generally circular fixed member having a dielectric surface, said circular member disposed coaxial to said shaft, said shaft rotating with respect to said circular member;

a first conductive path annularly disposed on said surface defining a continuous conductive path formed substantially coaxial to said rotary shaft;

a second conductive path annularly disposed on said surface, said second conductive path being substantially concentric to said first conductive path, said second conductive path having a plurality of circumferentially spaced radially extending conductive portions;

a first connecting member providing an electrically conductive connection to said first conductive path for connecting said first conductive path to a ground voltage potential;

a second connecting member providing a conductive connection to said second conductive path and connecting said second conductive path to a voltage potential;

a means for slidable conductive connection between said first conductive path and said second conductive path, said means connected to said shaft for rotation with said shaft;

said radially extending portions of said second conductive path sequentially disposed from one another in more than one discrete groups, each said discrete group producing sequentially unique variations in said voltage potential as said sequentially disposed radially extending portions are encountered by said slidable conductive connection means, said unique voltage variations corresponding to respective rotary positions of said shaft with respect to said circular member, each said unique voltage variation corresponding to a position indication;

means for determining an instant rotary position of said shaft, said instant position determined by a) monitoring said unique voltage variations to determine a relative position indication, and b) indexing an initial position by said relative position indication;

means for detecting and correcting errors in said determined rotary position by comparing said determined rotary position to an observed rotary position, said observed rotary position defined by monitoring said unique voltage variations as an indication of absolute rotary position, said detecting and correcting means updating said rotary position to correspond to said observed rotary position when said determined and said observed rotary positions differ.

9. An apparatus of claim 8, wherein said circular member is constructed from ceramic.

10. An apparatus of claim 8, wherein said first and second paths are metal stamping.

11. An apparatus of claim 8, wherein said first and second paths comprise a chemically etched conductive surface.

12. An apparatus of claim 8, wherein said slidable conductive connection means comprises brushes.

13. An apparatus of claim 8, wherein said means for determining a rotary position of said shaft comprises a microprocessor.

14. An apparatus of claim 8, wherein said radially extending portions of said second conductive path are organized into sequential neighboring groups, each sequential group having an incrementally different number of radially extending portions than its neighboring groups, whereby each group produces a group of pulses differentiable from the preceding group.

15. An apparatus of claim 8, wherein said radially extending portions of said second conductive path comprise a first group including one radially extending portion, said first group sequentially followed by a second group including two radially extending portions.

16. An apparatus of claim 8, wherein said radially extending portions of said second conductive path comprise a first group including one radially extending portion, said first group sequentially followed by successive groups, each said successive groups comprising more than one radially extending portions, wherein each successive group includes an additional radially extending portion with respect to its preceding group.

* * * * *